United States Patent [19]

Russek et al.

[11] Patent Number: 5,712,010

[45] Date of Patent: Jan. 27, 1998

[54] BRAIDED SLEEVING WITH RIB STRANDS

[75] Inventors: Jaime Ellstein Russek; Marcelo Mejia Garcia, both of Mexico City, Mexico

[73] Assignee: Vitrica, S.A. de C.V., Mexico City, Mexico

[21] Appl. No.: 650,258

[22] Filed: May 22, 1996

Related U.S. Application Data

[63] Continuation of Ser. No. 223,557, Apr. 6, 1994, abandoned.

[51] Int. Cl.$^6$ .............................. B29D 22/00; B32B 1/08
[52] U.S. Cl. .................... 428/36.3; 428/35.7; 428/36.1; 87/9; 138/123; 138/129; 138/130
[58] Field of Search .................. 428/35.7, 36.1, 428/36.3; 87/9; 138/123, 129, 130

[56] References Cited

U.S. PATENT DOCUMENTS

| | | | |
|---|---|---|---|
| 2,335,088 | 11/1943 | Shoemaker . | |
| 2,393,530 | 1/1946 | Harris . | |
| 3,022,802 | 2/1962 | Lewis . | |
| 3,079,281 | 2/1963 | Dexter et al. . | |
| 3,481,368 | 12/1969 | Vansickle et al. . | |
| 3,500,867 | 3/1970 | Elson . | |
| 3,522,413 | 8/1970 | Chrow | 219/301 |
| 3,609,651 | 9/1971 | Sladek | 539/177 G |
| 3,672,704 | 6/1972 | Christiansen | 285/110 |
| 3,744,528 | 7/1973 | Vestal | 138/89 |
| 3,808,840 | 5/1974 | Blezard et al. . | |
| 3,886,980 | 6/1975 | Elson . | |
| 3,891,556 | 6/1975 | Richardson et al. | 210/490 |
| 4,037,083 | 7/1977 | Leavines | 219/552 |
| 4,229,029 | 10/1980 | Boyer et al. | 285/242 |
| 4,259,991 | 4/1981 | Kutnyak | 138/127 |
| 4,276,908 | 7/1981 | Horne | 138/125 |
| 4,420,018 | 12/1983 | Brown, Jr. | 138/124 |
| 4,433,493 | 2/1984 | Poisson | 34/116 |
| 4,476,192 | 10/1984 | Imai et al. . | |
| 4,576,081 | 3/1986 | Fethius et al. . | |
| 4,602,892 | 7/1986 | Brookstein et al. | 403/265 |
| 4,684,762 | 8/1987 | Gladfelter . | |
| 4,700,171 | 10/1987 | Coffey et al. | 338/214 |
| 4,701,345 | 10/1987 | Giatras et al. . | |
| 4,754,685 | 7/1988 | Kite et al. | 87/9 |
| 4,775,566 | 10/1988 | Landry et al. . | |
| 4,784,886 | 11/1988 | Monget et al. | 428/36.1 |
| 4,802,510 | 2/1989 | Berlincourt et al. | 138/125 |
| 4,836,080 | 6/1989 | Kite et al. | 87/9 |
| 4,870,887 | 10/1989 | Tresslar et al. | 87/9 |
| 5,032,199 | 7/1991 | Landry et al. . | |
| 5,190,323 | 3/1993 | Oetiker | 285/39 |
| 5,217,778 | 6/1993 | LaCasse | 428/64 |
| 5,361,806 | 11/1994 | Lalikos et al. | 138/109 |
| 5,395,126 | 3/1995 | Tresslar | 277/166 |

FOREIGN PATENT DOCUMENTS

| | | |
|---|---|---|
| 2740421 | 3/1979 | Germany . |
| 3619299 | 12/1987 | Germany . |
| 863837 | 3/1961 | United Kingdom . |
| 1063899 | 4/1967 | United Kingdom . |
| 2 049 485 | 12/1980 | United Kingdom . |

OTHER PUBLICATIONS

Paper presented at TECHTEXTIL—Symposium 92 (Lecture 222) entitled "New Developments in Improving the Performance of Technical Textiles", Dr. C.C. Ou and D.G. Pickering of W.R. Grace & Co., Connecticut, 1992.

"Vermiculite Dispersions and Their Benefits as High Temperature Coatings and Binders," Dr. C.C. Ou and D.G. Pickering, TAAPI Press, May 1991.

(List continued on next page.)

*Primary Examiner*—Kathleen Choi
*Attorney, Agent, or Firm*—Fish & Richardson P.C.

[57] ABSTRACT

Braided tubular sleeving with at least two rib strands braided into and around the circumference, optionally encased in a smooth unribbed braid, and in one aspect having a collar or ferrule at one or both ends. It is also a kit comprising a section of the sleeving and a collar or collars and a method of protecting tubing, hose and wire bundles with such sleeving.

7 Claims, 2 Drawing Sheets

OTHER PUBLICATIONS

Material Safety Data Sheet, MSDS No. Z-01261 for Microlite Vermiculte Dispersions HTS-XE, HTS-XE20, HTS-SE Aug. 29, 1990.

W.R. Grace & Co. product literature, "Uncoated and Microlite Coated Fiberglass Mats Exposed to a Propane Torch at 2000°F", MD-7A, Printed in U.S.A. FA/GPS/1000,1992.

W.R. Grace & Co. product literature, "Microlite Vermiculite Dispersion", MD-48, Printed in U.S.A. FA/BFS May 1991 1000, 1990.

W.R. Grace & Co. Literature on Vermiculite Products, W.R. Grace & Co., Conn., 1990.

Ford Motor Company, Specification No. E9TB-18K459-CA, (Jan. 12, 1987).

Ford Motor Company, Initial Sample Report for Sleeve-Heater Hose Protector No. 478521, (Feb. 27, 1987).

Ratera, Semiautomatic winding machine 4PVL 320, Packaging: Bobbin specifications for fiber glass yarn (Unknown).

Ratera, Braiding machine pitch 208-83L (Unknown).

Techflex, Inc., Bell Helicopter TEXTRON Standard No. 130-053 (Apr. 26, 1989).

Techflex, Inc., FLEXO Bell Helicopter TEXTRON No. 130-053 Confirmation of Specifications (Nov. 27, 1989).

Vitrica, Vitricia Industrial Textile Products (Unknown).

5,712,010

BRAIDED SLEEVING WITH RIB STRANDS

This is a continuation of application Ser. No. 08/223,557, filed Apr. 6, 1994, now abandoned.

BACKGROUND OF THE INVENTION

This invention is novel braided tubular sleeving that is useful for thermal insulation of and protection for tubing, hose and wire bundles.

Tubing and hose in automotive and aircraft engines are subject to physical or mechanical damage from vibration and deterioration from the high temperatures in engine compartments. In automobile emission gas re-circulation (EGR) systems that carry hot engine exhaust gases for re-circulation or burning, temperatures get very high. The high temperatures cause the gases to coke the EGR valves. Heat radiating from the tubing can melt rubber and plastic components in the engine compartment. Hot tubing is also a hazard to workers. The use of thermal insulating and abrasion resistant sleeving to cover the tubing provides significant benefits, and suitable sleeving that can provide good thermal insulation to maintain a surface temperature about below 300° F. (150° C.) is very desirable. The sleeving serves also to dampen the vibration of the tubing and thus give additional mechanical protection. Braided sleeving comprised of polymeric materials, glass and metallic filaments are currently used in this service. The increasingly severe service environment and government mandates dictate a continuing need for improved products which provide better and more uniform performance. Some current sleeving has too loose a weave to provide adequate thermal insulation. Some do not retain uniform circumferential shape and do not give uniform insulation or mechanical protection for the covered tubing, hose or wire bundle. Some are not sufficiently rugged for the more demanding environment in which they are to be used.

The present invention is a rugged single and double walled sleeving that provides more uniform thermal insulation and excellent mechanical protection for tubing and hose.

SUMMARY OF THE INVENTION

This invention is a protective sleeving that retains its uniform circumferential shape when longitudinally compressed. It provides superior protection and thermal insulation for tubing, hose and the like in automotive and aircraft engine service. It is tubular sleeving comprising a principal braid of flexible filaments and at least two rib strands, which rib strands are braided into the principal braid in opposite helical directions from each other. It is also double walled sleeving comprising the ribbed sleeving described above encased in unribbed tubular braid. Optionally, the sleeving is of a predetermined length and has a hollow cylindrical collar disposed at one both ends.

The invention is also a kit comprising:
(a) a predetermined length of tubular sleeving as described above; and
(b) a hollow cylindrical collar.

It is also a method of protecting a tubular member comprising placing around the member tubular sleeving as described above and longitudinally compressing the sleeving at least 1 percent in length.

Other advantages and features will be apparent from the following description and from the claims.

Description of the Preferred Embodiments

Figure 1:
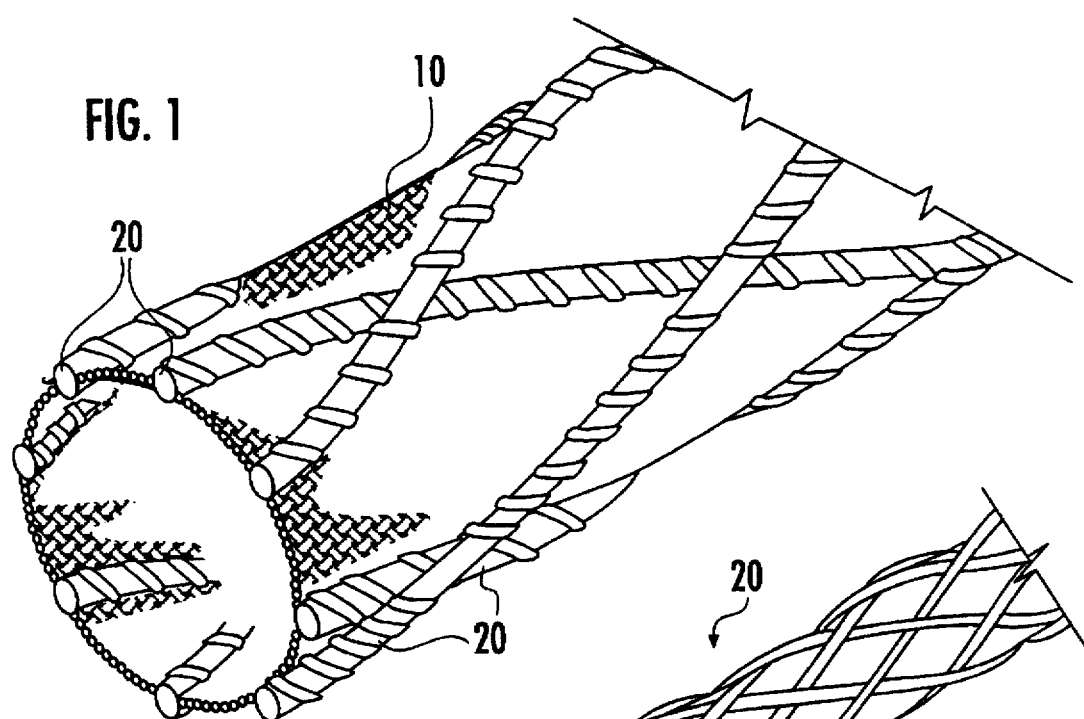
FIG. 1 is a perspective view of braided sleeving.

The braided tubular sleeving of this invention has a principal braid of interlaced flexible filaments with at least two rib strands (ribs) braided into it. The ribs are braided in opposite helical direction from each other. Referring to FIG. 1, the braid (10) consists of strands made by winding on an elongated mandrel in a substantially helical fashion so that the strands are interlaced in an over and under pattern. The sleeving will, in general, have a diameter in the range of about ¼ to 3 inches (0.64 to 7.6 cm) nominal diameter, but it may be of any size.

The flexible filaments of the principal braid are made of suitable polymeric materials such as poly(ethylene terephthalate (or other polyesters), nylons, aramid polymers, and poly(tetra-fluoroethylene) (PTFE) and mixtures. Ceramics, quartz and glass fibers are preferred for higher temperature service, with fiberglass being especially useful. The choice will depend on the application intended for the sleeving.

Figure 2:
FIG. 2 is a perspective view of a braided rib strand.

The rib strands (20) may be made of the same materials as the principal braid or of metallic filaments such as aluminum, copper, steel, inconel, spring steel, copper-coated steel, piano wire and especially stainless steel. For sleeving used in high temperature abrasive service, it is preferred that at least one filament of the rib strand be stainless steel wire. The metallic wire should be of a relatively small diameter in the range of one (1) to ten (10) mils. The ribs are made in a number of ways. They may be filaments bundled or twisted together. However, it is preferred that they be a braid that is made by braiding filaments, such as wire and/or fiberglass, into a relatively tight circular multi-filament thread as illustrated in FIG. 2. Such braid may be made with or without a center core or soul as exemplified by 24 in FIG. 2. A center core braid is made by interlacing filaments (26) around a core in the center during the braiding operation. A core gives the rib strand form and a more uniform circular rib. The filaments of the rib may be the same material as the flexible filaments of the principal braid or they may be metallic filaments or a combination. In a preferred embodiment, the rib strands (as illustrated in FIG. 2) are made with a core on a twelve carrier braiding machine. The twelve strands are preferably fiberglass or stainless steel or a combination of both. The core is made of several filaments, such as eight (8) ends of fiberglass yarn (such as ETDE 9.0 textured fiberglass yarn available from Owens-Corning Fiberglas Corporation). A fiberglass core is especially preferred. Ribs made entirely of fiberglass filaments may contain twelve strands (each with two (2) to four (4) ends of fiberglass yarn) around a core made of from about two (2) to twelve (12) ends of fiberglass yarn. A very good rib is made of twelve strands, each strand having one to six wires, around a core of two to ten ends of fiberglass yarn. The number of ends of yarn in the core determines the diameter of the rib and allows the rib strand to be sized as desired. A suitable wire is 0.0029 inch diameter stainless steel wire available from Willing B. Wire Corporation.

It is preferred that the diameter of the rib strands be larger than that of the strands of the principal braid as illustrated in FIG. 1. It is especially preferred that the diameter of the rib strand be at least fifty percent larger than the principal braid strands. It is especially preferred that the diameter of the ribs be at least twice that of the principal braid. For example, for a 1 inch nominal diameter sleeving, the principal braid is about 1/32 inch (0.8 mm) and the rib strand is 3/32 inch (2.4 mm).

The ribs are braided into the principal braid of the sleeving on a conventional tubular braiding machine (braider). It is customary that about half the braids be woven in one direction and half in the opposite direction. Such braiders include a plurality of carriers (or bobbins) of yarn. The yarn or strands are interlaced under tension. Suitable machines have from about 12 to 144 carriers. Braiding machines with 88 and 96 carriers are common. It is also customary that the braids be positioned in the braid at a diagonal of about 45 degrees, but other configurations can be used. The weave should be such that the sleeving is free to expand by at least thirty (30) percent. A very tight weave unsuitably restricts the flexibility of the sleeving, and too loose a weave will not provide the required thermal insulation. The ribs may be braided from separate carriers or from carriers with strands of the principal braid strands.

It is necessary that at least two rib strands be woven into and around the circumference of the sleeving in opposite directions from each other. At least six ribs are preferred, and more preferably eight. It is also preferred that they be evenly spaced around the circumference of the sleeving with half in one helical direction and half in the other direction, forming a diamond shaped pattern as shown in FIG. 1. Such a pattern assists in maintaining the uniform tubular shape of the sleeving.

Figure 3:
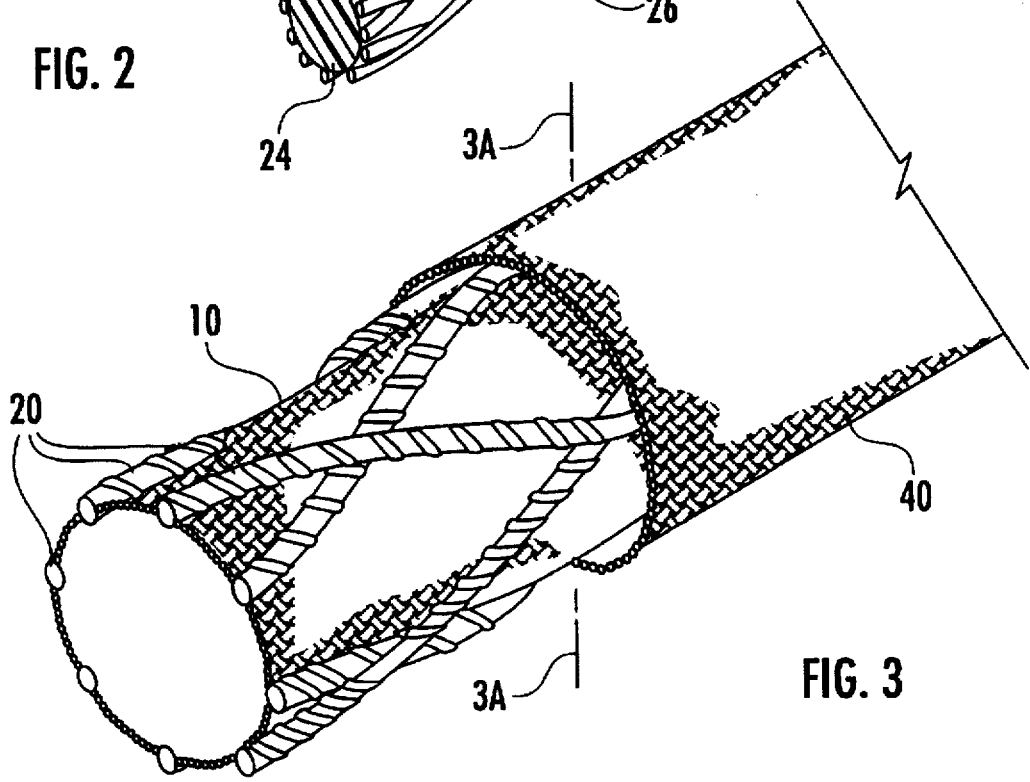
FIG. 3 is a sectional, perspective view of double walled sleeving.
Figure 3A:
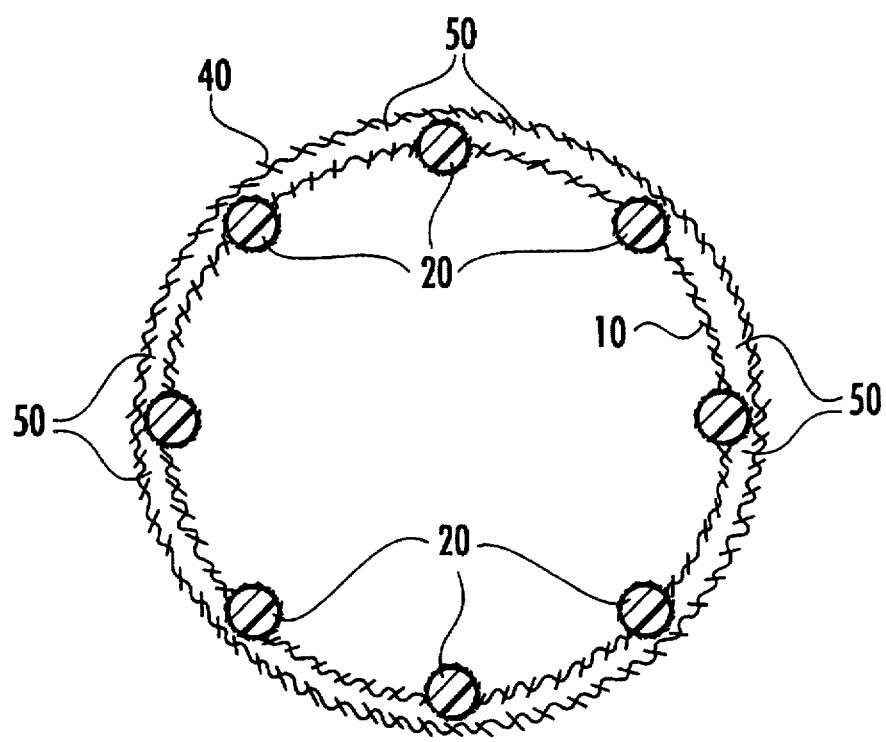
FIG. 3A is a cross-section view of the double walled sleeving of FIG. 3.

As illustrated in FIG. 3, this invention also comprises a first ribbed braided sleeve encased in a second or outer unribbed smooth braid that has no ribs. As illustrated in FIG. 3A, the first or ribbed braided sleeving is sized to conveniently fit inside the second outer sleeve in such a way that the rib strands, but not the surface of the principal braid, contact the inside surface of the second sleeve. This provides an air space (50 in FIG. 3A) that enhances the thermal insulation properties of the double wall sleeving. The second braided sleeve, in which the first sleeve is encased, is formed by braiding strands in the same way as described for the first sleeve except it has no rib strands. The second sleeve is comprised of the same or different materials as the first braid. It may have the same or a different number of braided strands. For example, the first ribbed sleeve may have 96 braids of which two (2) to twelve (12) are rib strands and the second outer sleeve comprises 80 braided strands. In the double walled sleeving, the rib strands of the first sleeve are larger in diameter than the strands of filaments in the principal braid. It is especially preferred that the diameter of the ribs be at least thirty (30) percent larger in diameter than the diameter of the principal braid. For example, a 1 inch nominal diameter sleeve having a braid of about 1/32 inch (0.8 mm) will have ribs of about 3/32 inch (2.4 mm) diameter.

Either or both of the braided sleeves may be coated with a suitable coating to give color, to reduce fraying and to provide additional abrasion and/or thermal protection. The coating can be applied by spraying, dipping or by any other suitable method that gives the desired results. Dip or spray coating the braid as it comes from the braiding machine is usually convenient. Some yarns, especially fiberglass, have an oil/starch coating to provide protection and for ease of handling. It is desirable to remove any such pre-coating to prepare the surface for the braid coating. This can generally be accomplished by heating. For example, the braid is heated by passing it through a gas flame oven and then coated by passing it through a coating bath or spray. The choice of coating composition is determined by cost, convenience and the service use of the sleeving. An acrylic resin coating is useful for sleeving used in relatively low temperature service, such as covering wire bundles. For high temperature service above 300° F. (150° C.), a suitable coating would be an aluminum powder or, preferably, powdered or dispersed vermiculite.

Figure 4:
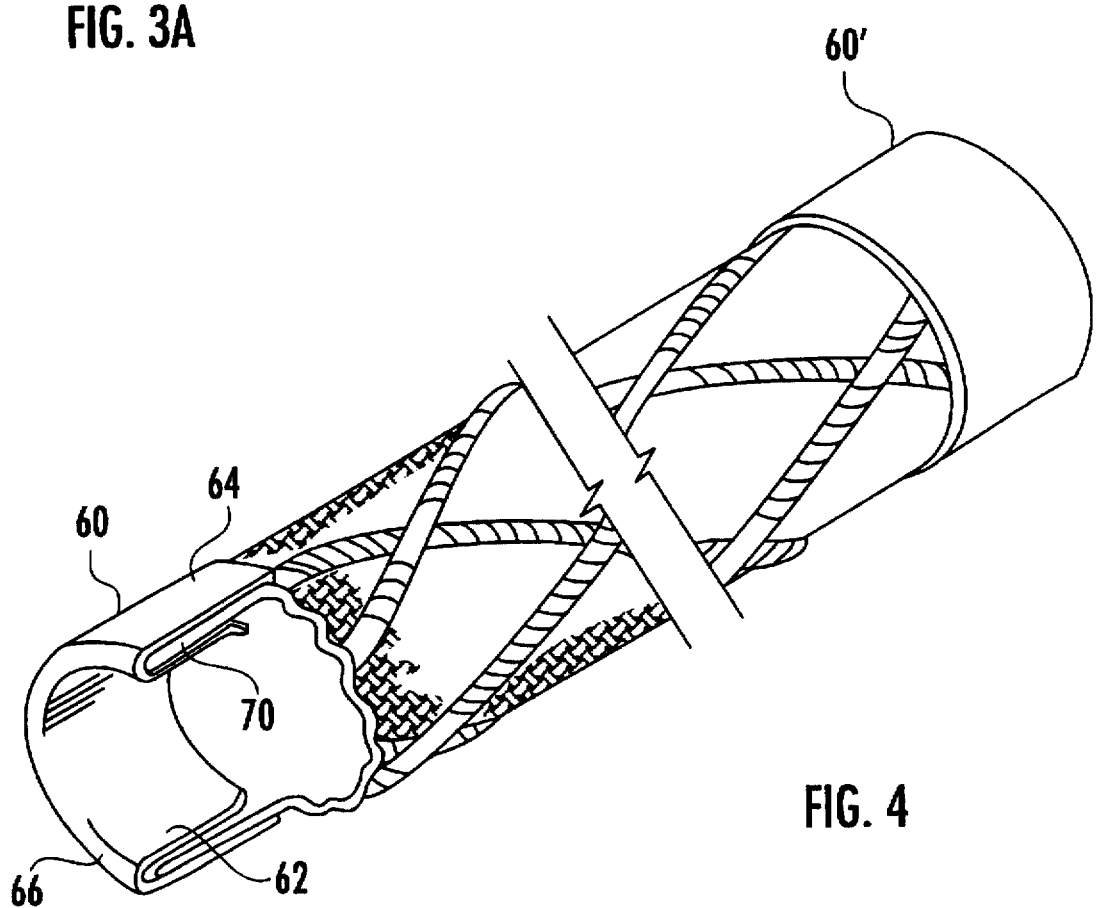
FIG. 4 is a perspective view of sleeving fitted with collars at each end.

The invention also comprises sections of single and double walled sleeving of predetermined length (as 12 inches, etc.) with ferrules or collars on at least one end as shown in FIG. 4. The collar functions to assist in longitudinal compression of the sleeving to expand the diameter and to protect the ends from fraying, spreading and unraveling (spraying). Collars may be attached or detachable. For example, a metal collar may be designed to crimp onto the sleeving or it may be constructed to fit on the sleeving in a removable manner such as the collar illustrated in FIG. 3. When longitudinally compressed, the sleeving expands in diameter to provide an enlarged annular space between the sleeving and enclosed tubing, hose or bundle. The resulting annular air space increases the thermal insulating ability of the sleeving. In the double walled embodiment, there will be an air space between the walls of the sleeving and between the sleeving and enclosed tubing, providing excellent thermal insulation. Thus, for example, a sleeving section of about 12 inches (30.5 cm) length with a diameter of 0.950 inches (2.4 cm) expands to a diameter of 1.650 inches (4.2 cm) when longitudinally compressed to about 8 inches (20.3 cm). This will enlarge the annular space by (1.650−0.950)/2=0.350 inches or 0.9 cm. One of the advantages of this invention is the relative uniformity of expansion of the diameter. This results from the stiffness and configuration of the rib strands that give more dimensional stability to the sleeving than that in prior art sleeving.

Useful collars or ferrules may be made of any relatively rigid material that can be molded or formed into an appropriate shape and that are usable in the environment (heat, abrasion, vibration, etc.) of use. The choice also depends on the intended use of the sleeving material and the kind of material used in the filaments. For example, sleeves made of fiberglass or fiberglass and steel require a suitably rugged collar, as one made of steel. Engineering polymers such as polyesters, nylons, aramids, polymers and the like are also suitable, particularly for use with sleeving made from like materials. Metals, including aluminum, copper, steel, copper-coated steel and stainless steel, are very suitable. In general, stainless steel is preferred.

Collars may be any design that can be installed around the protected tubing and that engage the end of the sleeving. For example, FIG. 4 depicts a ferrule constructed of two concentric cylinder sections (62 and 64) in which one end (66) of the annular space is closed. The annular space (70) must be sufficient to enclose the end of a braided sleeving, and the inside diameter of the inner cylinder must be sufficient to surround the encased tubing or hose. The inside diameter of the inner cylinder may be approximately the same diameter as the sleeving in its expanded form. Thus, as described above, in a sleeving compressed from twelve (12) inches (30.5 cm) to eight (8) inches (20.3 cm) in use, the inside diameter is about 1.65 inches (4.2 cm). Collar diameters of about 0.5 to 1.5 times the normal diameter of the sleeving are preferred, and 0.8 to 1.5 times is especially preferred. The cylinders are of the same or different lengths but are, in general, relatively short compared with the length of the sleeving section. It is expedient for the top cylinder to be shorter than the inner cylinder to provide easier crimping or other attachment to the sleeving. The collars may be attached by mechanical means or with a suitable adhesive. In a preferred embodiment, a collar having approximately the same diameter as that of the installed compressed sleeving is crimped to the sleeving.

Collars may be a single piece, as described above, or may be designed with two or more pieces that can be assembled together for use. A single-piece design is less costly but can only be used to fit around tubing, hose or bundles that have one end detached (that may be attached after installation of the sleeving). For many applications, this will be completely satisfactory. However, for installation on tubing or hose that cannot be conveniently encircled with a one piece collar, it is desirable to have a collar made of two or more pieces that can be attached together. Attachment can be made by fitting a band around the assembled pieces, using adhesives to adhere them together (particularly suitable for non-metallic collars), and attaching the pieces with screws or bolts fitted into suitable fittings. The braided sleeving may be cut into predetermined lengths and equipped with a detached suitably sized collar or ferrule. Such a package or kit of sleeving and collar allows the end user to custom fit the sleeve for use. The kit may also comprise a length of sleeve with a collar attached at one end and a second detached collar to be installed by the end user.

In another aspect, the invention is a process of thermal insulation and protection of tubing from mechanical damage in a high temperature abrasive environment. The process comprises fitting suitably sized tubular sleeving constructed as described above over a tube, hose or wire bundle and longitudinally compressing the sleeving by about one (1) to sixty (60) percent. It is preferred that the length be compressed from about five (5) to fifty (50) percent, and more preferred from ten (10) to forty-five (45) percent. The sleeving can be equipped with a collar as described above that is sized to fit around the protected tubular material. It is preferably sized to the diameter of the longitudinally compressed sleeving. Exemplary of such process is fitting a ¾ inch EGR tube of an automobile engine with one (1) inch nominal diameter sleeving having an attached 1.25 in stainless steel collar at each end. The sleeving is installed around the tubing and compressed. For example, a twelve (12) inch (30.5 cm) sleeve is compressed to about ten (10) inches (25.4 cm) with a corresponding increase in sleeve diameter. This sleeving acts as a thermal insulator and provides protection from mechanical damage. Since the sleeve is a good thermal insulator, its outside surface is much cooler than the surface of the EGR tubing. Thus, a worker who touches the sleeving will not be burned.

These representative embodiments are illustrative of the invention, but other modifications and variations are within the scope of the following claims.

What is claimed is:

1. Tubular sleeving cut in a predetermined length and having a hollow cylindrical collar disposed at one end, said tubular sleeving comprising a principal braid of strands of flexible filaments having at least two braided multifilament rib strands braided into and around the circumference of the principal braid in opposite helical directions from each other, said rib strands being of larger diameter than the diameter of the strands of the principal braid.

2. The sleeving of claim 1 in which the collar comprises two concentric cylinders with an annular space which is made of a material selected from the group consisting of polyesters, nylon, aramid polymers, polytetrafluoroethylene, mixtures of such polymers, copper, steel and stainless steel, and which collar has an inside cylinder diameter between about 0.5 and 1.50 times the inside diameter of the sleeving.

3. The sleeving of claim 1 in which the rib strands further comprise a core around which said multifilaments are braided.

4. A kit comprising:
   (a) a predetermined length of a tubular sleeving comprising a principal braid of flexible fiberglass filaments and at least two multifilament rib strands braided into and around the circumference of the principal braid in opposite helical directions from each other in a crossover pattern, said rib strands being of larger diameter than the diameter of the strands of the principal braid, said rib strands comprising braided fiberglass on a fiberglass core; and
   (b) a hollow cylindrical collar comprising two concentric cylinders having an annular space between the cylinders which is closed at one end and is made of a material selected from the group consisting of polyesters, nylons, aramid polymers, polytetrafluoroethylene, mixtures of such polymers, copper, steel and stainless steel, and has an inside cylinder diameter between 0.5 and 1.50 times the inside diameter of said sleeving.

5. The kit of claim 4 in which the rib strands comprise stainless wire braided around a fiberglass core and in which the number of rib strands is between 4 and 12.

6. The sleeving of claim 3 in which the rib strands are made with a core on a twelve carrier braiding machine.

7. The sleeving of claim 3 in which the rib strands are made with fiberglass filaments and stainless steel filaments.

* * * * *